United States Patent [19]
Niu et al.

[11] Patent Number: 6,161,160
[45] Date of Patent: Dec. 12, 2000

[54] NETWORK INTERFACE DEVICE ARCHITECTURE FOR STORING TRANSMIT AND RECEIVE DATA IN A RANDOM ACCESS BUFFER MEMORY ACROSS INDEPENDENT CLOCK DOMAINS

[75] Inventors: Autumn J. Niu, Sunnyvale; Jerry Chun-Jen Kuo; Po-shen Lai, both of San Jose, all of Calif.

[73] Assignee: Advanced Micro Devices, Inc., Sunnyvale, Calif.

[21] Appl. No.: 09/146,163

[22] Filed: Sep. 3, 1998

[51] Int. Cl.[7] .............................. G06F 13/36; G06F 13/12; G06F 15/76; H04L 12/54; H04L 12/413

[52] U.S. Cl. .............................. 710/129; 710/52; 710/56; 710/57; 710/58; 710/60; 710/130; 709/213; 709/234; 709/236; 714/805; 714/811

[58] Field of Search .................................. 710/61, 52, 56, 710/57, 58, 60, 129, 105, 130; 713/400, 600; 709/213, 234, 236; 712/32; 714/805, 811; 370/381, 517, 463

[56] References Cited

U.S. PATENT DOCUMENTS

| | | | |
|---|---|---|---|
| 3,665,416 | 5/1972 | Hikosaka ................................... | 710/57 |
| 3,729,717 | 4/1973 | Koe et al. ................................. | 710/61 |
| 4,076,964 | 2/1978 | Henrion et al. ......................... | 370/517 |
| 4,604,658 | 8/1986 | Hibino et al. ............................ | 386/90 |
| 4,907,225 | 3/1990 | Gulick et al. ........................... | 370/463 |
| 5,274,768 | 12/1993 | Traw et al. .............................. | 709/236 |
| 5,276,896 | 1/1994 | Rimmer et al. ......................... | 709/213 |
| 5,299,313 | 3/1994 | Petersen et al. ........................ | 709/234 |
| 5,315,706 | 5/1994 | Thomson et al. ....................... | 710/105 |
| 5,406,554 | 4/1995 | Parry ....................................... | 370/381 |
| 5,434,872 | 7/1995 | Petersen et al. ........................ | 714/811 |
| 5,524,218 | 6/1996 | Byers et al. ............................. | 710/129 |
| 5,537,556 | 7/1996 | Mundkur ................................. | 710/129 |
| 5,592,630 | 1/1997 | Yamagami et al. ..................... | 711/117 |
| 5,659,799 | 8/1997 | Wu et al. ................................. | 710/57 |
| 5,732,094 | 3/1998 | Petersen et al. ........................ | 714/805 |
| 5,860,021 | 1/1999 | Klingman ................................ | 712/32 |

*Primary Examiner*—Thomas C. Lee
*Assistant Examiner*—Katharina Schuster

[57] ABSTRACT

A network interface device includes a random access transmit buffer and a random access receive buffer for transmission and reception of transmission and receive data frames between a host computer bus and a packet switched network. The network interface device includes a memory management unit having read and write controllers for each of the transmit and receive buffers, where each write controller operates in a clock domain separate from the corresponding read controller. The memory management unit also includes a synchronization circuit that controls arbitration for accessing the random access memories between the read and write controllers. The synchronization circuit asynchronously monitors the amount of data stored in the random access transmit and receive buffer by asynchronously comparing write pointer and read pointer values stored in gray code counters, where each counter is configured for changing a single bit of a counter value in response to an increment signal. A descriptor management unit is used to control DMA reading and writing of transmit data and receive data from and to system memory, respectively, based on descriptor lists, respectively. A pipelining architecture also optimizes transfer of data between the buffers, the PCI bus, and the media access controller.

38 Claims, 11 Drawing Sheets

NETWORK INTERFACE DEVICE ARCHITECTURE FOR STORING TRANSMIT AND RECEIVE DATA IN A RANDOM ACCESS BUFFER MEMORY ACROSS INDEPENDENT CLOCK DOMAINS

BACKGROUND OF THE INVENTION

1. Technical Field

The present invention relates to network interfacing and more particularly, to methods and systems for buffering data between a host bus interface and a media access controller accessing Ethernet (IEEE 802.3) media.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by the MAC, and receive data is stored in a receive FIFO by the MAC prior to transfer to the host computer via the host computer bus interface.

One disadvantage with the use of a FIFO for a transmit buffer or a receive buffer is the increased latency encountered during the buffering process. The latency of the network interface device is the time delay between the time that a data frame is supplied to the network interface device and the time the data is transmitted on the network media, or vice versa.

An additional disadvantage with the use of a FIFO for transmit buffer or receive buffer is the increasing complexity associated with maintaining status information for each data frame stored in the FIFO buffer. If a stored data frame is to have corresponding status information, then an additional FIFO buffer would be required for storing the status information for each stored data frame. Hence, a transmit buffer may require a data frame FIFO for the actual frame data, and a status FIFO for storing the corresponding status information for each data frame. Such an arrangement would result in a substantial increase in the amount of area required on a chip for the status FIFO. In addition, additional synchronization logic would be required to maintain correspondence between the stored frame data and the corresponding status data, increasing the cost and complexity of the network interface device.

An additional problem caused by the buffering of data between the clock domain of the host computer and the clock domain of the network interface device is buffer overflow or underflow. For example, buffer overflow can occur when the time domains between the host bus and the network media are uncontrollable to the extent that data is stored in the buffer at a rate faster than the data can be removed, resulting in an overflow situation. Conversely, underflow occurs if data is removed from the FIFO buffer faster than the data can be supplied.

Hence, the non-synchronous relationship between the host bus clock domain and the network clock domain have required the necessity of FIFO buffers to compensate for timing discrepancies between the host computer and the network.

Another fundamental problem with use of a FIFO as a transmit buffer or receive buffer is that there is no convenient way for the network interface device to bypass, or "flush," invalid data. For example, if the media access controller receives a runt packet from the network (i.e., an invalid packet less than the minimum required frame size of 64 bytes), the MAC cannot cause the invalid data stored in the FIFO to be flushed, without eliminating the entire contents of the receive FIFO. Hence, the invalid data is transferred via the host computer bus and stored in host computer memory, before the host computer can determine that the transferred data is invalid. The reduction in throughput may have substantial effects, especially in full-duplex networks, where the host computer bus is heavily utilized by the network interface device for simultaneous transmission and reception of data frames on the network medium.

An additional problem encountered with conventional network interface devices is the latency encountered during host bus transfers. In particular, two types of bus transfers may be used, namely master mode and slave mode. In master mode, the network interface device operates as a master, and initiates the transfer of data across the host bus by requesting use of the bus, and then transferring the data as a data burst. One example of a host bus is the peripheral component interconnect (PCI) local bus, where a transfer of data over a PCI bus includes an address phase followed by one or more contiguous data phases. The PCI bus protocol makes use of a centralized, synchronous arbitration scheme in which each PCI master must arbitrate for each transaction by use of a request signal and a grant signal. For example, a network interface device having data to transfer (e.g., either receive data or transmit data) will assert a request signal to request use of the bus. Typically, a host CPU will respond with a grant signal which is followed by assertion of a frame signal that together identify when the bus is available for use by the network interface.

One problem in conventional network interface devices is the occurrence of wait states following an address phase on the PCI bus. Such wait states cause increased latency on the PCI bus, further reducing the overall throughput of the network interface device.

An additional problem with conventional network interface devices is the occurrence of wait states encountered during a complex bus termination condition, where certain events on the PCI bus forcibly halt a PCI bus data transfer. Two examples of complex conditions include when a host memory is not ready to receive a data transfer after the bus has been secured, or when the host memory becomes unable to continue receiving data following initiation of the data transfer. In either case, the target asserts a STOP# signal on the PCI bus to terminate the data transfer. Prior art systems frequently lose data from the FIFO buffer memory in response to encountering such complex conditions, for example retry or disconnect states. Hence, complicated recovery arrangements are conventionally required in prior art systems to mitigate the loss of data. For example, higher network protocol layers may need to send a message across the network, requesting the transmitting station to resend a data packet.

DISCLOSURE OF THE INVENTION

There is a need for an arrangement that enables use of a random access memory in a network controller, as opposed to a FIFO buffer, to compensate for timing discrepancies between the host computer and the network.

There is also a need for an arrangement enabling the use of a random access memory as a buffer in a network interface device, where potential synchronization problems between the clock domain of the host computer and the clock domain of the network are resolved to enable efficient control of the random access memory during the writing and reading of transmit or receive data.

There is also a need for an arrangement in a network interface device, where a synchronization circuit controls priority between writing and reading operations to and from the random access memory to enable efficient memory management for monitoring the status of stored frame data.

There is also a need for an arrangement in a network interface device, where a network interface architecture asynchronously monitors the status of data stored in a random access transmit buffer and a random access receive buffer to enable multiple memory controllers to store and read data into the random access memories using multiple clock domains.

There is also a need for an arrangement in a network interface device having a memory controller that enables access to a random access transmit buffer or a random access receive buffer according to either a direct memory access (DMA) or slave access.

There is also a need for an arrangement in a network interface device having a circuit that asynchronously monitors the status of a random access transmit buffer and a random access receive buffer, enabling memory controllers to operate in response to prescribed conditions detected by the synchronization circuit.

These and other needs are attained by the present invention, where a memory management unit, configured for controlling transfer of transmit data and receive data into respective random access transmit and receive buffers, includes a synchronization circuit for asynchronously monitoring the amount of data stored in the random access transmit buffer and the random access receive buffer. The asynchronous monitoring by the synchronization circuit enables memory management unit operations to be performed in respective independent clock domains.

According to one aspect of the present invention, a method in a network interface device for sending data frames from a host computer to a network medium comprises storing transmit data received from a host bus into a random access transmit buffer according to a host bus clock, asynchronously monitoring the amount of data stored in the random access transmit buffer, and outputting the stored transmit data from the random access transmit buffer to a media access controller according to a transmit clock independent from the host bus clock and based on the asynchronously monitoring step, for transmission on the network medium. The asynchronous monitoring of the amount of data stored in the random access transmit buffer enables the transmit data to be stored in the random access transmit buffer according to the host bus clock domain, and also enables the transmit data to be output from the random access transmit buffer according to a network transmit clock, independent from the host bus clock, with minimal latency in the network interface device. Since the amount of data stored in the random access transmit buffer is monitored asynchronously, operations in the network interface device may be performed on an event-driven basis, where the asynchronous detection of events within the random access transmit buffer enables optimized performance in the appropriate clock domain.

Another aspect of the invention provides a method in a network interface device for receiving data frames from a network medium to a host computer, comprising storing receive data received from a media access controller into a random access receive buffer according to a network receive clock, asynchronously monitoring the amount of data stored in the random access receive buffer, and outputting the stored receive data from the random access receive buffer to a host bus interface according to a host bus clock independent from the network receive clock and based on the asynchronously monitoring step, for transmission on a host bus.

Still another aspect of the present invention provides a network interface device comprising a media access controller configured for simultaneously outputting transmit data according to a network transmit clock, and receiving receive data from a network medium according to a network receive clock, a bus interface unit configured for transferring via a host bus the receive data and the transmit data to and from a host computer memory according to a host bus clock, a random access receive buffer configured for storing the receive data received by the media access controller according to the network receive clock, and outputting the stored receive data to the bus interface unit according to the host bus clock, a random access transmit buffer configured for storing the transmit data supplied by the bus interface unit according to the host bus clock, and outputting the stored transmit data to the media access controller according to the network transmit clock, and a memory management unit. The memory management unit is configured for controlling the transfer of the transmit data and receive data in the random access transmit buffer and the random access receive buffer, and includes a synchronization circuit for asynchronously monitoring the amount of data stored in the random access transmit buffer and the random access receive buffer. The asynchronous monitoring by the synchronization circuit enables the memory management unit to interact with the media access controller, the bus interface unit, and the random access transmit and receive buffers on an event-driven basis, where operations can be performed in the appropriate clock domain based on the asynchronous monitoring of events in the synchronization circuit.

This aspect of the network interface device is particularly advantageous in the case where the memory management unit includes first, second, third, and fourth management blocks configured for controlling the transfer of transmit data to and from the random access transmit buffer, and receive data to and from the random access receive buffer, respectively. Hence, each of the management blocks can be optimized for performing its corresponding memory functions in its corresponding clock domain by obtaining any relevant status information from the synchronization circuit. Hence, the network interface device can be configured for efficient transfer of transmit and receive data, in a manner that eliminates any contention issues between the host bus clock, the network transmit clock or the network receive clock.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in th e appended claims.

BRIEF DESCRIPTION OF THE DRAWINGS

Reference is made to the attached drawings, wherein elements having the same reference numeral designations represent like elements throughout and wherein:

FIGS. 1A and 1B illustrate an exemplary network interface device including a synchronization circuit for controlling buffer memory controllers according to an embodiment of the present invention;

BEST MODE FOR CARRYING OUT THE INVENTION

The present invention will be described with the example of a network interface device in a packet switched network, such as an Ethernet (IEEE 802.3) network. A description will first be given of a network interface architecture, followed by the arrangement for monitoring the storage of a data frame in a buffer memory, independent of host computer clock and network data clock domains. It will become apparent, however, that the present invention is also applicable to other network interface device systems.

NETWORK INTERFACE ARCHITECTURE

Figure 1A:
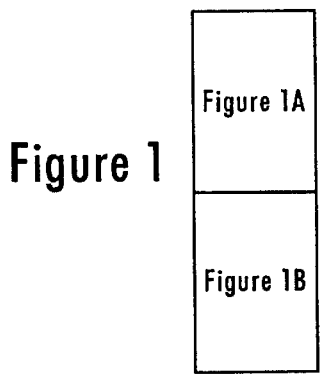
FIGS. 1A and 1B show block diagrams illustrating how the systems in FIGS. 1A and 1B are coupled together.
Figure 1A:
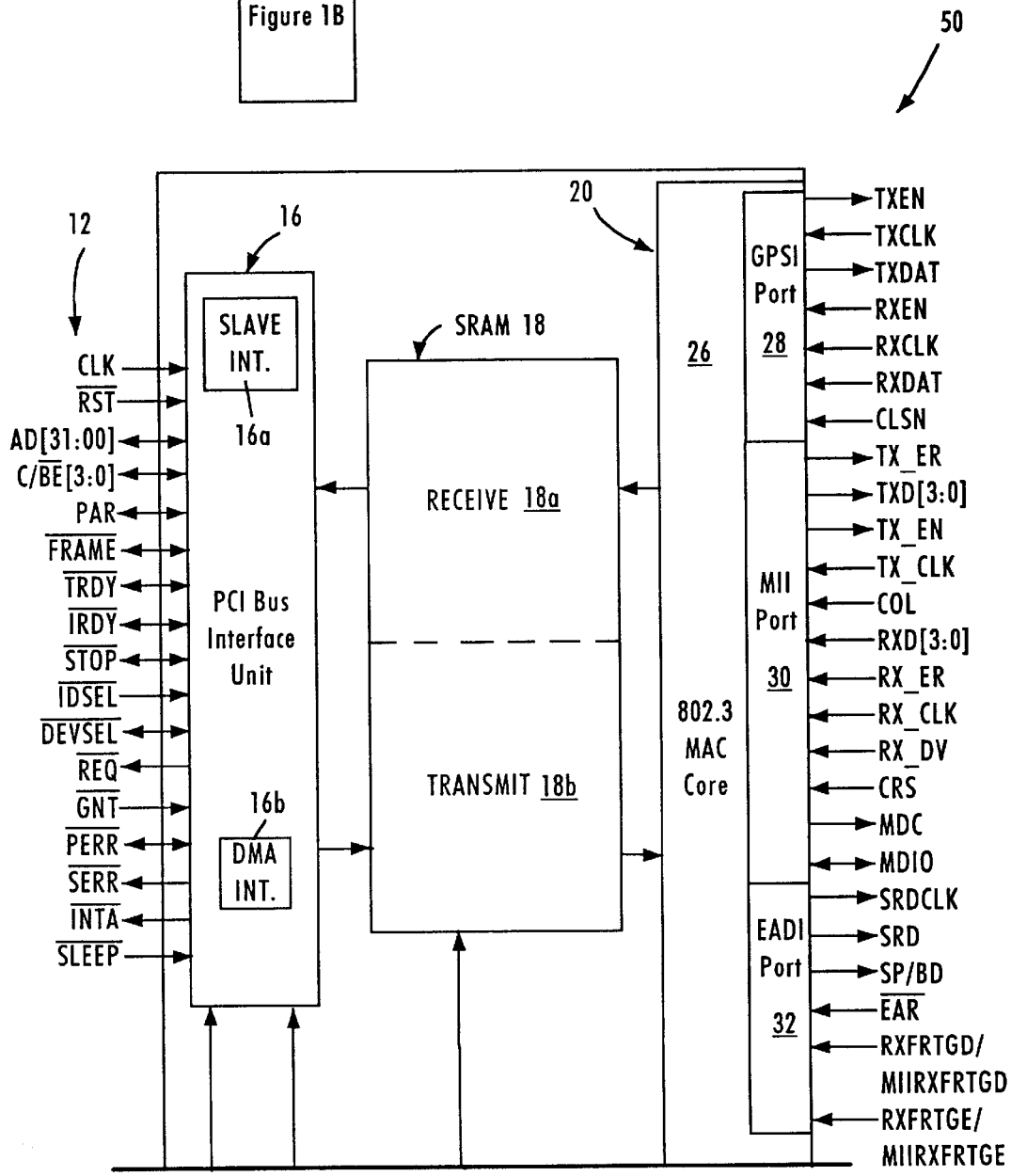
Figure 1B:
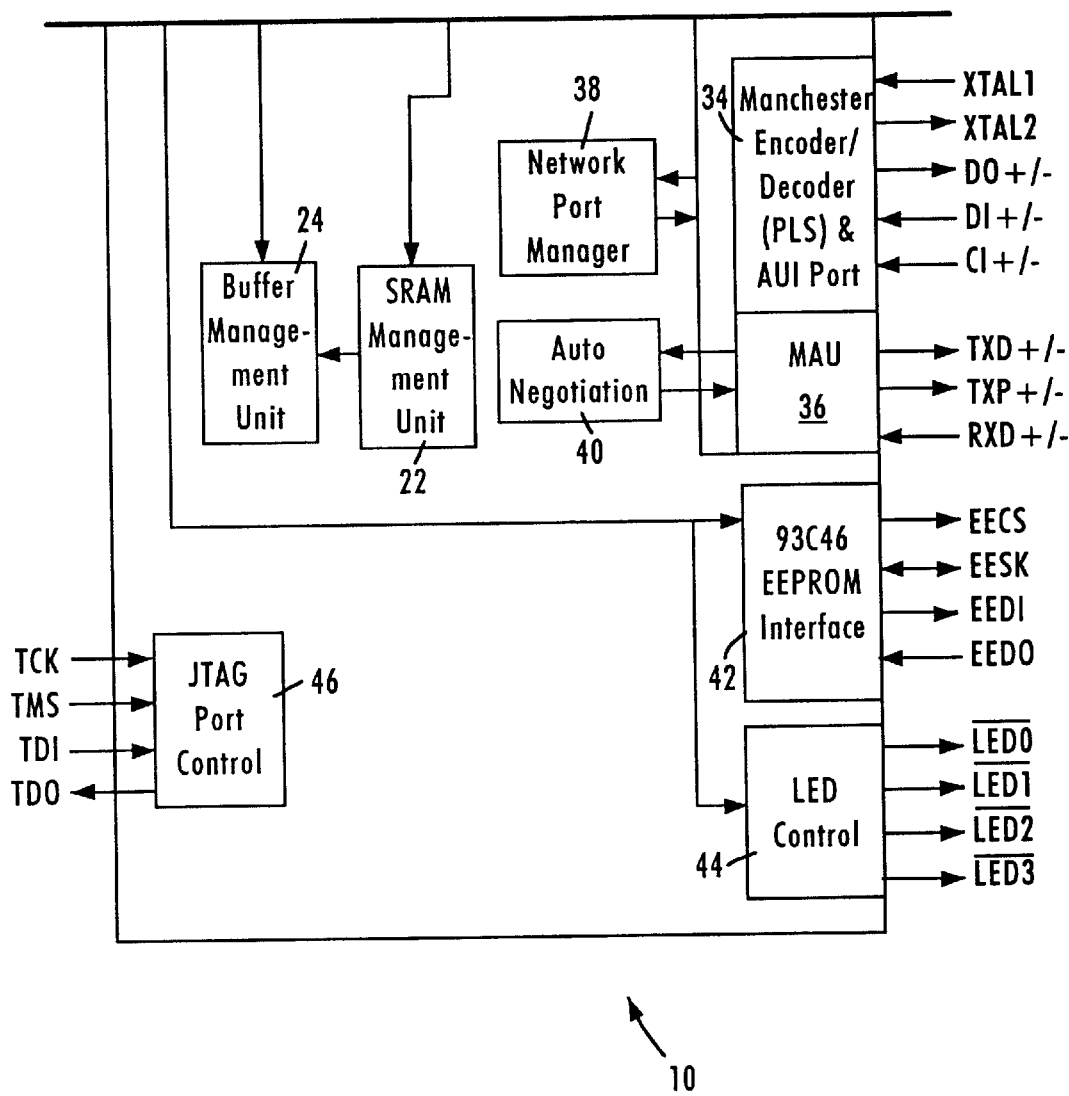

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a media access controller interface device (MAC) 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The MAC 20 includes a MAC core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

MEMORY MANAGEMENT ARCHITECTURE

Figure 2:
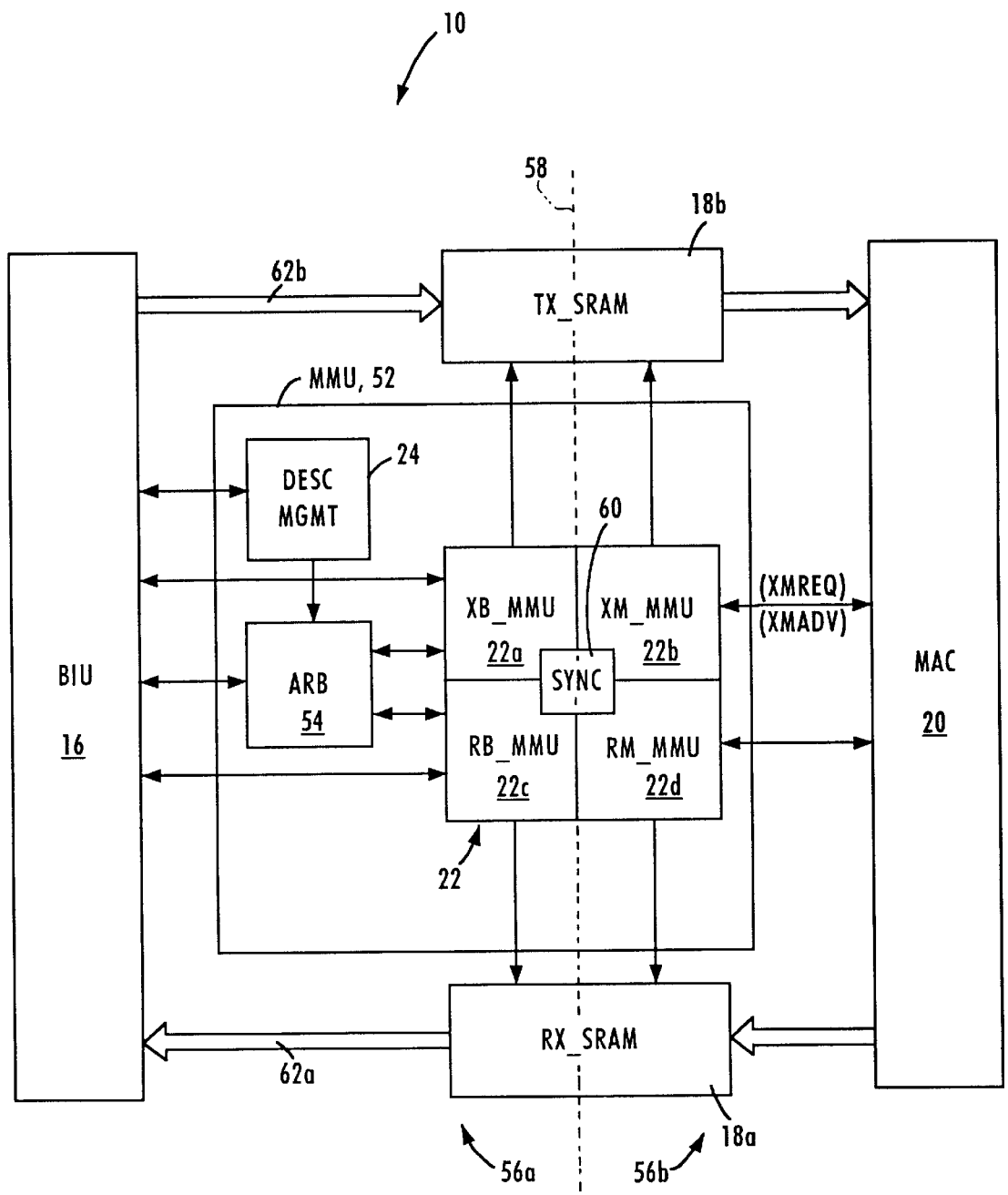
FIG. 2 is a block diagram illustrating the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a dual-port receive SRAM portion 18a and a dual-port transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit includes the buffer management unit 24, also referred to as the descriptor management unit, the SRAM MMU 22, and an arbitration unit 54. The descriptor management unit 24 is configured for fetching, from host computer memory, descriptor information (i.e., transfer information) specifying host computer memory locations for retrieving and storing transmit data and receive data, respectively. The arbitration unit 54 arbitrates DMA requests for data transmission, data reception, descriptor lists from the descriptor management block 24, and status.

The SRAM MMU 22 includes separate controllers (i.e., management blocks) for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit block (XB_MMU) 22a, a transmit-data MAC-side memory management unit block (XM_MMU) 22b, a receive-data bus-side memory management unit block (RB_MMU) 22c, a receive-data MAC-side memory management unit block (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI host bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and the TX_SRAM 18b, enabling the memory management blocks 22a, 22b, 22c, and 22d to read and write to the memory 18 between the two clock domains 56a and 56b. Thus, problems that would ordinarily arise between the three clock domains (RMCLK, XMCLK, BCLK) in the individual memory management units 22a, 22b, 22c and 22d are avoided by use of the synchronization circuit 60 according to a prescribed arbitration logic.

Figure 3:
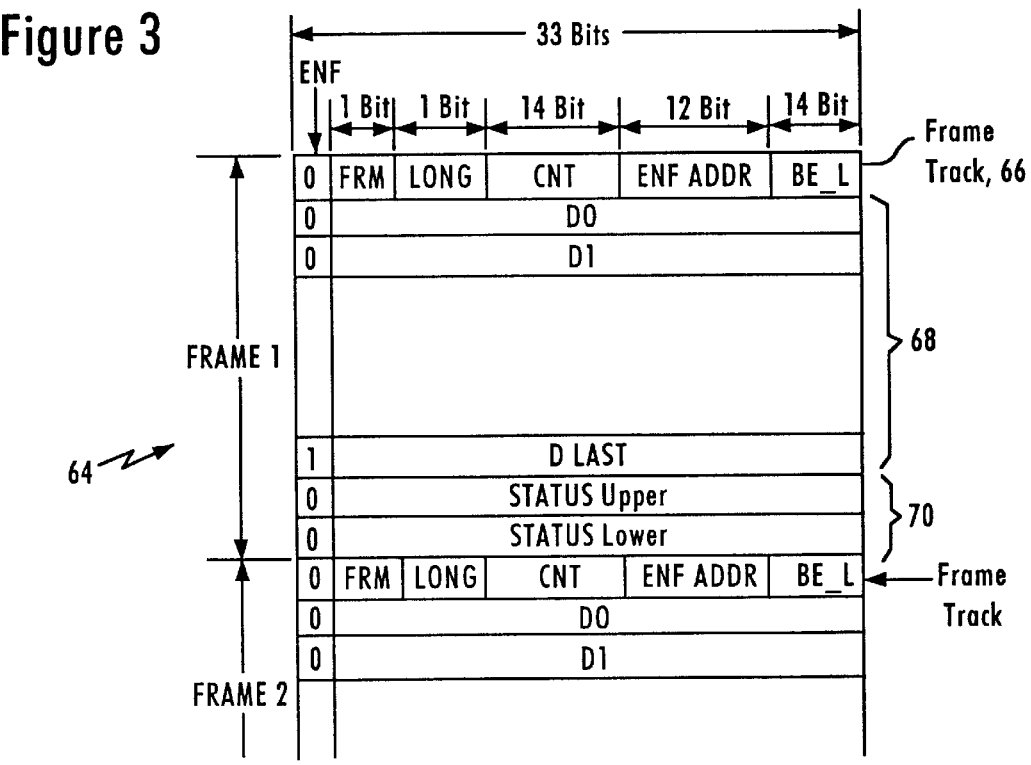
FIG. 3 is a diagram illustrating an exemplary data structure of a data frame stored in the random access memory of FIGS. 1 and 2.

FIG. 3 is a diagram illustrating a data structure of a receive data unit in the RX_SRAM 18a. A similar structure also may be used for storing data in the TX_SRAM 18b. As shown in FIG. 3, each stored data frame 64 includes a frame track field 66 preceding a group of data bytes representing the frame data 68 (i.e., the packet data to be transmitted by the MAC 20), followed by a control field 70. In this case, the RM_MMU 22d stores frame track information 66 and the control field 70 related to the receive data frame 68. The frame track field 66 is used by the RB_MMU 22c to keep track of the location of the corresponding receive data frame 68 in the RX_SRAM 18a. Hence, the frame track 66 enables the RB_MMU 22c to quickly flush a stored data frame 64 having receive data 68 and jump to the beginning of the next stored data frame (e.g., 642), based on an end of frame address field (ENF ADDR), a count (CNT) field specifying the number of DWORDS (D0, D1, . . . , DLAST), and an end of frame (FRM) bit indicating whether the data frame 64 contains valid data ready for reading. The byte enable-last field (BE_L) specifies how many of the bytes in the DLAST field are valid.

Figure 5B:
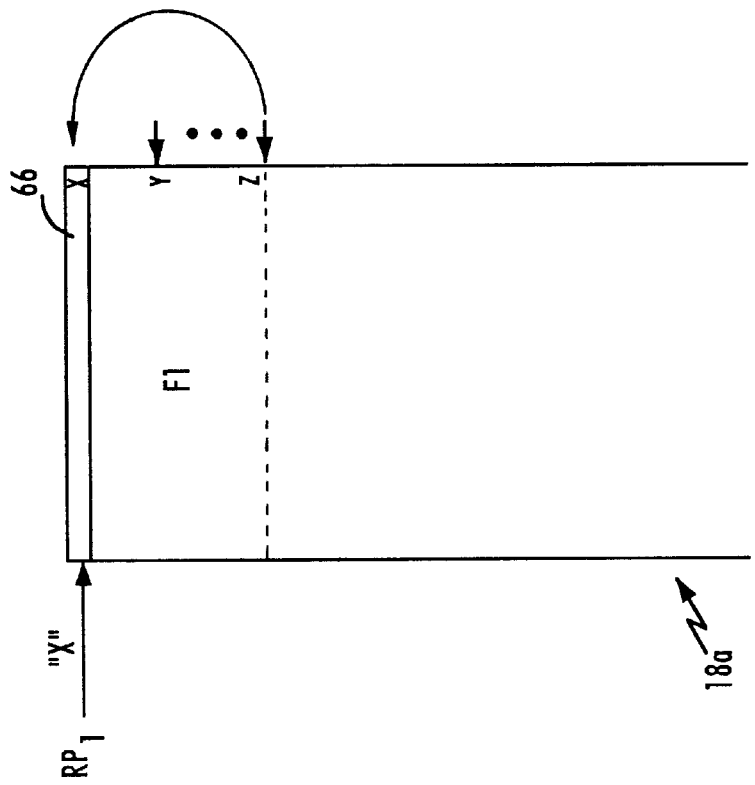
FIGS. 5A and 5B are diagrams illustrating storage conditions when the receive memory of FIG. 2 stores at least one full frame of data and less than one full frame of data, respectively.
Figure 5A:
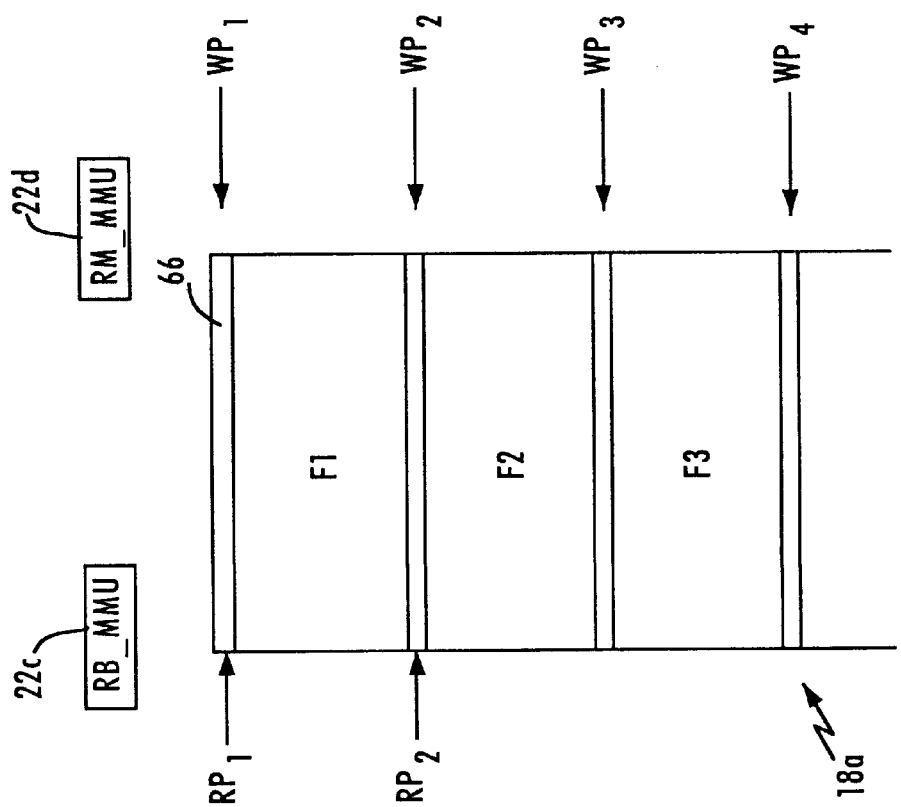

FIG. 5A is a diagram illustrating multiple data frames (F1, F2, etc.) stored in the RX_SRAM 18a. Assume that the RM_MMU 22d is writing a sequence of data frames 64 (frame 1, frame 2, etc.) into RX_SRAM 18a using a write pointer (WP), while the read controller 22c is reading out the data frames from the RX_SRAM 18a to the BIU 16 using a read pointer (RP). If the read controller discards (e.g., flushes) a transmit data frame and desires to jump to the beginning of the next data frame, the synchronization circuit 60 must be able to track the start and beginning of each data frame to ensure that the read controller 22c properly locates the beginning of the next data frame.

Figure 4:
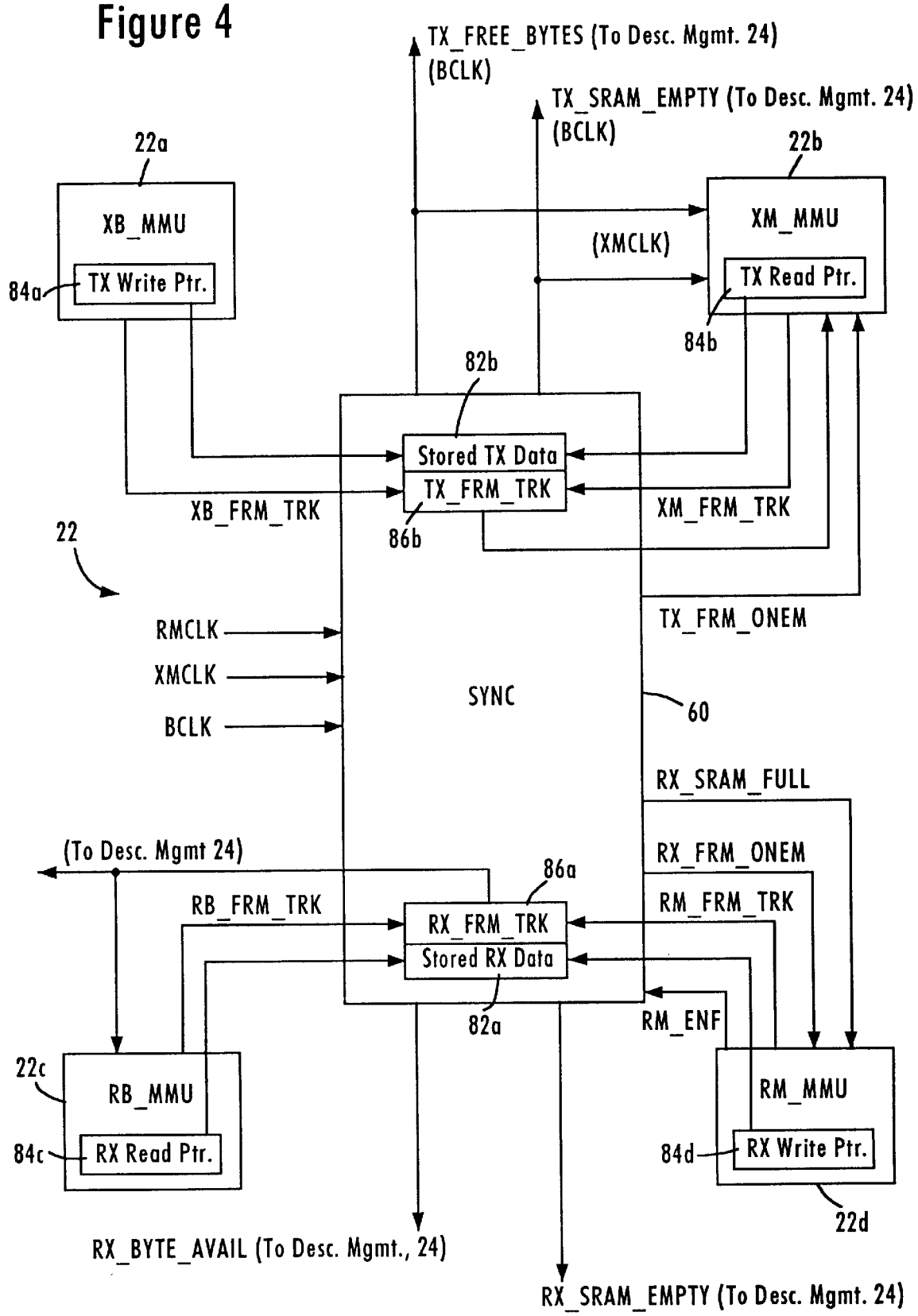
FIG. 4 is a block diagram illustrating in detail the architecture of the memory management unit of FIG. 2 according to an embodiment of the present invention.

FIG. 4 is a block diagram illustrating in detail the MMU 22. The synchronization circuit 60 includes asynchronous monitors 82a and 82b for asynchronously monitoring the amount of stored receive data and transmit data in the SRAMs 18a and 18b respectively, enabling the memory management units 22a, 22b, 22c, and 22d to track the number of stored data frames in their respective clock domains. The memory management unit tracks the number of stored data frames based on the difference between the write frame counter value and the read frame counter values. For example, the management block 22a includes a write counter 84a for incrementing a write pointer value (Tx Write Ptr.) in response writing the transmit data to the random access transmit buffer 18b. The management block 22b includes a read counter 84b for incrementing a read pointer value (Tx Read Ptr.) in response to reading the transmit data from the random access transmit buffer 18b. Similarly, the management block 22d includes a write counter 84d for incrementing a write pointer value (Rx Write Ptr.) in response to writing the receive data to the random access receive buffer 18a, and the management block 22c includes a read counter 84c for incrementing a read pointer value (Rx Read Ptr.) in response to reading the receive data from the random access receive buffer 18a. As described above, the XB_MMU 22a and the RB_MMU 22c operate in the PCI bus clock domain (BCLK) 56a, whereas the XM_MMU 22b and the RM_MMU 22d operate in the network clock domain 56b. More specifically, the XM_MMU 22b operates in the network transmit clock domain (XMCLK), and the RM_MMU operates in the network receive clock domain (RMCLK).

Hence, the reading and writing into either of the SRAMs 18a or 18b involves crossing a clock domain boundary 58, which may adversely affect determining the amount of data in memory.

For example, assume a read frame counter pointer value (Rx Read Ptr.) and a write counter pointer value (Rx Write Ptr.) are stored in binary counters, where a write counter has a value (WR=100) and a read counter in the second independent clock domain transitions from (RD=011) to (RD=100). Since the clock domains 56a and 56b operate independently of each other, a logic comparator performing a comparison between the write counter and read counter may erroneously conclude that the read and write counters have different values at a point in time where the read counter has a transitional value (e.g., 101, 111, or 000) as the read counter is being updated. Hence, the attempt to perform an asynchronous comparison between the binary read and write counters may cause an erroneous conclusion that the read and write pointers are not equal.

One possible solution for preventing asynchronous comparisons during counter transitions is to provide latched outputs for the counter values. However, such an arrangement would severely degrade the timing performance of the random access memory as a buffer device.

SYNCHRONIZATION CIRCUIT OPERATION

According to the disclosed embodiment, each management block 22a, 22b, 22c, 22d includes a counter 84 for the corresponding SRAM, where each counter 84 is configured for counting a pointer value by changing a single bit of a pointer value in response to a corresponding reading or writing operation.

As shown in FIG. 4, the write controller (RM_MMU) 22d for the receive SRAM 18a is configured for writing a frame (e.g., the data frame 64) into the receive SRAM 18a according to a receive MAC clock (RMCLK) 74 synchronized relative to the network clock domain 56b. The write controller 22d, upon writing an entire data frame 64 into the receive SRAM 18a, outputs a write signal (RM_ENF) to the synchronization circuit 60 indicating the completed writing of the data frame 64. Specifically, the write controller 22d writes the data frame 64 in FIG. 3 by receiving the frame data 68 from the MAC 20 according to the RMCLK 74. The write controller 22d then reserves a portion (location "X" in FIG. 5B) of the prescribed memory location 64 of the transmit SRAM 18a by first writing null data for the frame track 66 to hold header information. The actual frame data 68 is then written (location "Y"), followed by control information 70 (at location "Z"). Following the writing of the control information 70 at location "Z", the write controller 22d then returns to the frame track field 66 at location "X" and updates the frame track with the appropriate header information, including setting the end of frame address (ENF ADDR), updating the count (CNT) field indicating the number of DWORDS in the frame, the frame bit (FRM) indicating that the memory location 64 stores valid data, and the ENF bit which indicates the last double word of data. The write controller 22d concurrently supplies the frame track information (RM_FRM_TRK) to the synchronization circuit 60 for storage in a holding resistor 86a.

Hence, the write controller 22d outputs the write signal to the synchronization circuit 60 after updating the frame track field 66, at which point the SRAM 18a stores a valid data frame 64 at a prescribed location. As shown in FIG. 5A, successive writing of frames results in outputting a corresponding plurality of frame track values (RM_FRM_TRK) to the holding register 86a. Assuming, however, that the read controller 22c attempted to read the first frame F1 from the memory location 64 prior to completion by the write controller 22d, as shown in FIG. 5B, the read controller 22c would obtain invalid data, since the frame track field 66 would not yet be updated with valid data. In addition, the read controller 22c supplies the read frame track information from the accessed memory location (RB_FRM_TRK) to indicate the read status for the holding register 86a. Hence, invalid frame track data would be written to the holding register 86a if the read controller attempted a read operation before completion of the corresponding write operation.

According to the disclosed embodiment, the synchronization circuit 60 determines a presence of a complete stored data frame 64 in the random access memory 18a in response to read and write signals and independent of the bus clock 72 and the MAC clock (RMCLK) 74. Specifically, the synchronization circuit 60 includes a write receive frame counter (not shown) configured for changing a single bit of a write receive counter value in response to the write signal (RM_ENF) output from the write controller 22d. The synchronization circuit 60 also includes a read receive frame counter (not shown) configured for changing a single bit of a read receive frame counter value in response to the read signal (not shown) from the read controller 22c. As described above, the read controller 22c is configured for reading the frame 64 from the receive SRAM 18a according to a host bus clock (BCLK) 72, where the read controller 22c outputs a read signal to the synchronization circuit 60 in response to the reading of the frame.

According to the disclosed embodiment, the write receive frame counter and the read receive frame counter in the synchronization circuit 60 are implemented as gray code counters, such that only a single bit of a counter value is changed in response to assertion of the status signal from the corresponding memory controller 22. Use of the gray code counter ensures that any asynchronous comparison between the write receive frame counter and the read receive frame counter does not result in any erroneous values due to multiple bit transitions that may otherwise occur in counters using binary-format representations. The gray code counter values are compared asynchronously by the synchronization circuit, which outputs a one or more receive frame signal (RX_FRM_ONEM) indicating the presence of at least one stored receive frame in the receive SRAM 18a if the receive frame counter values are unequal.

The above-described arrangement is also used by the XB_MMU 22a and the XM_MMU 22b, where the XB_MMU 22a outputs a signal (not shown) to the synchronization circuit 60 in response to writing a complete data frame into the TX_SRAM 18b and the XM_MMU 22b outputs a signal (not shown) to the synchronization circuit 60 in response to reading a complete data frame from the transmit SRAM 18b. The synchronization circuit includes a write transmit frame counter and a read transmit frame counter (not shown), implemented as gray code counters, to asynchronously determine the presence of at least one stored transmit frame in the transmit SRAM 18b. The synchronization circuit 60 outputs a one or more transmit frame signal (TX_FRM_ONEM) in response to asynchronously detecting at least one stored transmit frame in the transmit SRAM 18b.

Hence, the synchronization circuit can asynchronously determine the presence of at least one stored data frame in either the RX SRAM 18a or the TX SRAM 18b, independent of the clock domains used to write and read into the respective transmit or receive buffers. As described below, the use of gray code counters may also be implemented in each of the management blocks 22a, 22b, 22c, and 22d to enable the synchronization circuit 60 to asynchronously determine the amount of transmit data and receive data in the transmit SRAM 18b and receive SRAM 18a, respectively.

STORING FRAME TRACK INFORMATION

As described above with respect to FIGS. 5A and 5B, the different clock domains 56a and 56b may cause contention problems during the writing of frame track information 66 into the holding register 84, depending on whether there are one or more frames in the memory 18a, as shown in FIG. 5A, or less than one full frame, as shown in FIG. 5B.

The purpose of the holding registers 86a and 86b is to hold frame track information for the current receive frame and transmit frame being read from the RX_SRAM 18a and TX_SRAM 18b, respectively. Hence, the synchronization circuit 60 needs to be able to ensure that only valid data is written into the holding registers 86 (i.e., frame track data written into the frame track field 66 after having written a complete data frame).

According to the disclosed embodiment, the synchronization circuit 60 selectively stores frame track information based on the asynchronously determined presence of at least one data frame in the corresponding transmit or receive buffer. For example, the synchronization circuit 60 selectively stores either the first tracking information (RM_FRM_TRK) or the second tracking information (RB_FRM_TRK) to the holding register 86a based on an asynchronous detection of at least one stored data frame in the receive memory 18a. The synchronization circuit 60 outputs a one-or-more received frame signal (RX_FRM_ONEM) equal to a value of 1 if the RX_SRAM 18a stores at least one data frame as shown in FIG. 5A. If the memory 18a stores less than a complete frame of data, as shown in FIG. 5B, then the synchronization circuit 60 outputs the one-or-more signal as having a value of RX_FRM_ONEM=0. Hence, priority is given to the read controller 22c to write the corresponding frame track information into the holding register 86a if one or more frames are stored in memory 18a as shown in FIG. 5A, and grants priority to the write controller 22d if less than one full frame (i.e., a complete frame) is stored in memory 18a, as shown in FIG. 5B.

TRANSFERRING DATA BASED ON ASYNCHRONOUS MONITORING

As described above, the synchronization circuit 60 asynchronously monitors the amount of data stored in the random access transmit buffer 18b and the random access receive buffer 18a, enabling each of the management blocks 22a, 22b, 22c, and 22d to operate as event-driven controllers that transfer data in response to detected conditions by the synchronization circuit 60. Hence, each of the management blocks 22a, 22b, 22c, and 22d can operate in its corresponding clock domain, without concern of operations in other management blocks operating in other clock domains, by obtaining relevant status conditions from the synchronization circuit 60.

As shown in FIG. 4, each management block $22_i$ includes a memory counter for incrementing a memory pointer value in response to reading or writing the corresponding data from the corresponding SRAM. For example, the XB_MMU 22a includes a transmit write counter 84a for incrementing a write pointer value in response to writing a double word (DWORD) into a memory location of the 32-bit SRAM 18b. According to the disclosed embodiment, each of the counters 84 are implemented as gray code counters, where the counter changes a single bit of the corresponding pointer value in response to the writing or reading of the corresponding data. Hence, the XB_MMU 22a increments the write counter 84a by changing a single bit of the TX Write Ptr. value in response to writing a DWORD of transmit data into the TX_SRAM 18b. Similarly, the XM_MMU 22b includes a read counter 84b that increments the read pointer value (TX Read Ptr.) by changing a single bit of the corresponding read point value in response to reading a DWORD from the random access transmit buffer 18b. As shown in FIG. 4, the RX write counter 84d and the RX read counter 84c operate in the same manner, i.e., by changing a single bit of the corresponding pointer value in response to writing or reading a DWORD from the RX_SRAM 18a.

As shown in FIG. 4, each of the management blocks 22a, 22b, 22c, and 22d output the corresponding pointer value to the synchronization circuit 60. Specifically, the RX Write Ptr. value and the RX Read Ptr. value are supplied to an asynchronous monitor 82a that asynchronously determines the amount of stored receive data (e.g., on a double word basis) in the RX_SRAM 18a. For example, the monitor 82a may include a comparator for performing a gray code comparison of the read and write pointer values. Hence, the asynchronous comparator 82a asynchronously monitors the amount of data stored in the random access receive buffer 18a.

Similarly, the asynchronous monitor 82b asynchronously monitors the amount of data stored in the random access transmit buffer 18b by performing a gray code comparison between the TX Write Ptr. value and the TX Read Ptr. value from the counters 84a and 84b, respectively.

The synchronization circuit 60, in response to the asynchronous monitoring of the amount of data stored in the RX_SRAM 18a and the TX_SRAM 18b outputs various status indicators, flags, and status value, either asynchronously or synchronized to one of the three clock domains to enable a controller element to receive valid data. For example, the synchronization circuit 60 outputs a value indicating the amount of free bytes (TX_FREE_BYTES) to the descriptor management 24 synchronous with the host bus clock (BCLK). The sync block 60 also outputs the TX_FREE_BYTES information to the XM_MMU 22b synchronous with the transmit MAC clock (XMCLK), enabling the XM_MMU 22b to read the amount of free bytes in the TX_SRAM in the appropriate clock domain. Similarly, the sync block 60 outputs an empty flag (TX_SRAM_EMPTY) to the descriptor management 24 synchronous with the BCLK, and to the XM_MMU 22b synchronous with the XMCLK. The synchronization block 60 outputs a transmit request signal (XMREQ), shown in FIG. 2, to the MAC 20 indicating that a sufficient amount of transmit data is stored in TX_SRAM 18b to initiate network transmission. The MAC 20 can then output an advance signal (XMADV) in response to the XMREQ signal and in response to a detected idle condition on the media to start transmit data transmission. Hence, the XM_MMU 22b can selectively output transmit data from the TX_SRAM 18b based on flags and the amount of data stored in the TX_SRAM 18b, as asynchronously determined by the sync block 60.

Similarly, the RM_MMU selectively holds writing received data to the RX_SRAM 18a in response to a full flag (RX_SRAM_FULL) from the sync block 60, indicating that the amount of stored receive data in the RX_SRAM 18a has exceeded a prescribed amount.

As shown in FIG. 4, the synchronization block 60 also outputs information to the descriptor management 24, including data indicating the amount of data available in the RX_SRAM 18a (RX_BYTE_AVAIL) and an empty flag (RX_SRAM_EMPTY). As described below, the descriptor management block 24 is configured for initiating requests to the arbitration unit 54 for transferring transmit and receive data from and to host system memory based on the information in flags output by the sync block 60. Hence, the XB_MMU 22a and the RB_MMU 22c operate based on burst transfers on the PCI bus that are initiated by the descriptor management 24. However, the XB_MMU 22a and the RB_MIU 22c may also operate under the control of a host CPU if the network interface device 10 is configured to operate in slave mode.

Hence, by relying on the sync block 60, the management blocks 22a, 22b, 22c, and 22d do not need to synchronize to another clock domain to compare information. Hence, the sync block 60 enables the other management blocks to operate exclusively in their respective domains, without the necessity of synchronizing to another clock domain. Hence, the disclosed architecture enables faster, more reliable design implementation without the necessity of synchronizing two different clock domains unnecessarily.

Figure 6:
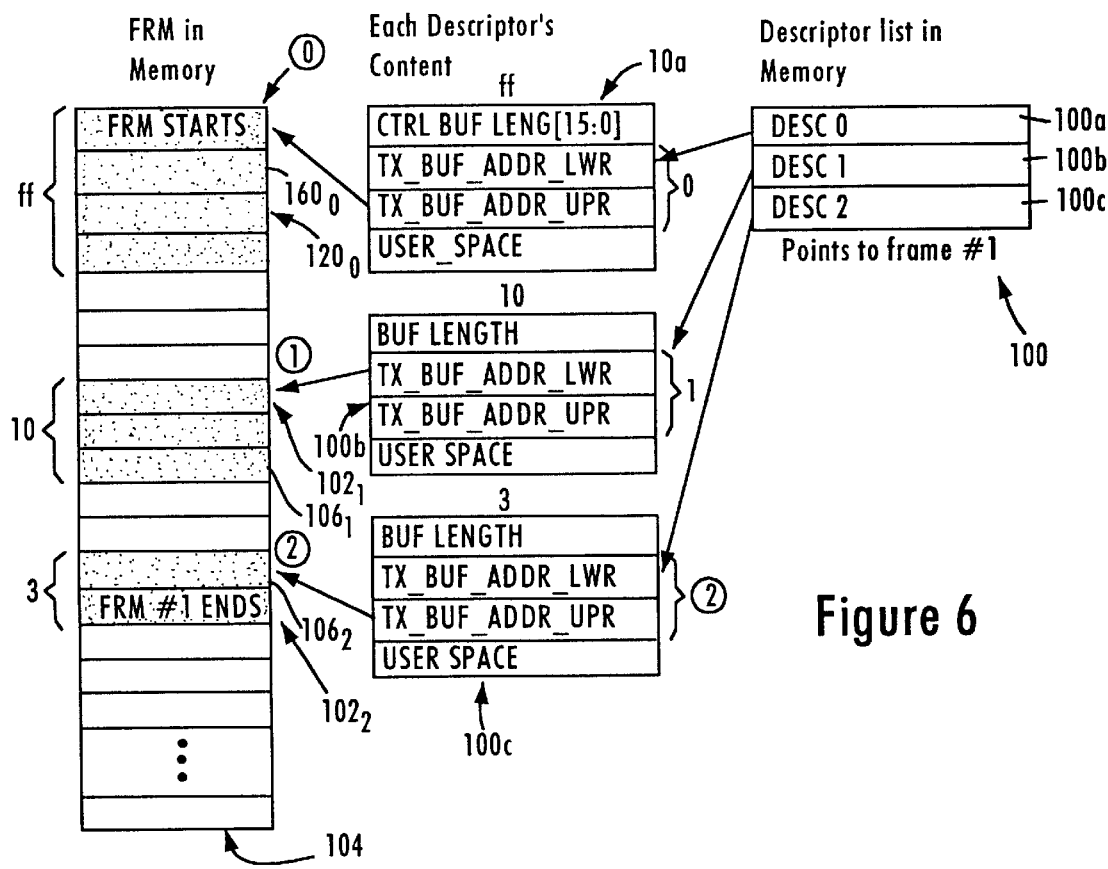
FIG. 6 is a diagram illustrating descriptor lists stored in system memory for use by the descriptor management controller of FIG. 2.

FIG. 6 is a diagram illustrating descriptor lists in system memory, used by the descriptor management block 24 to obtain information related to retrieval and storage of transmit data and receive data into system memory, respectively. The descriptors 100 identify locations 102 in system memory 104 that store at least portions 106 of a data frame, respectively. In particular, each descriptor 100 specifies the starting address (e.g., TX_BUF_ADDR) of where the descriptor management 24 may find the transmit data portion 106 in system memory. The descriptor 100 also includes control information, the buffer length, etc., enabling the network interface device 10 to perform a DMA transfer by the PCI bus. After the descriptor management 24 fetches the descriptor information 100, the descriptor management 24 will write status information back to system memory upon completion of the data transfer (e.g., reading transmit data from system memory, or writing receive data to system memory).

Figure 7:
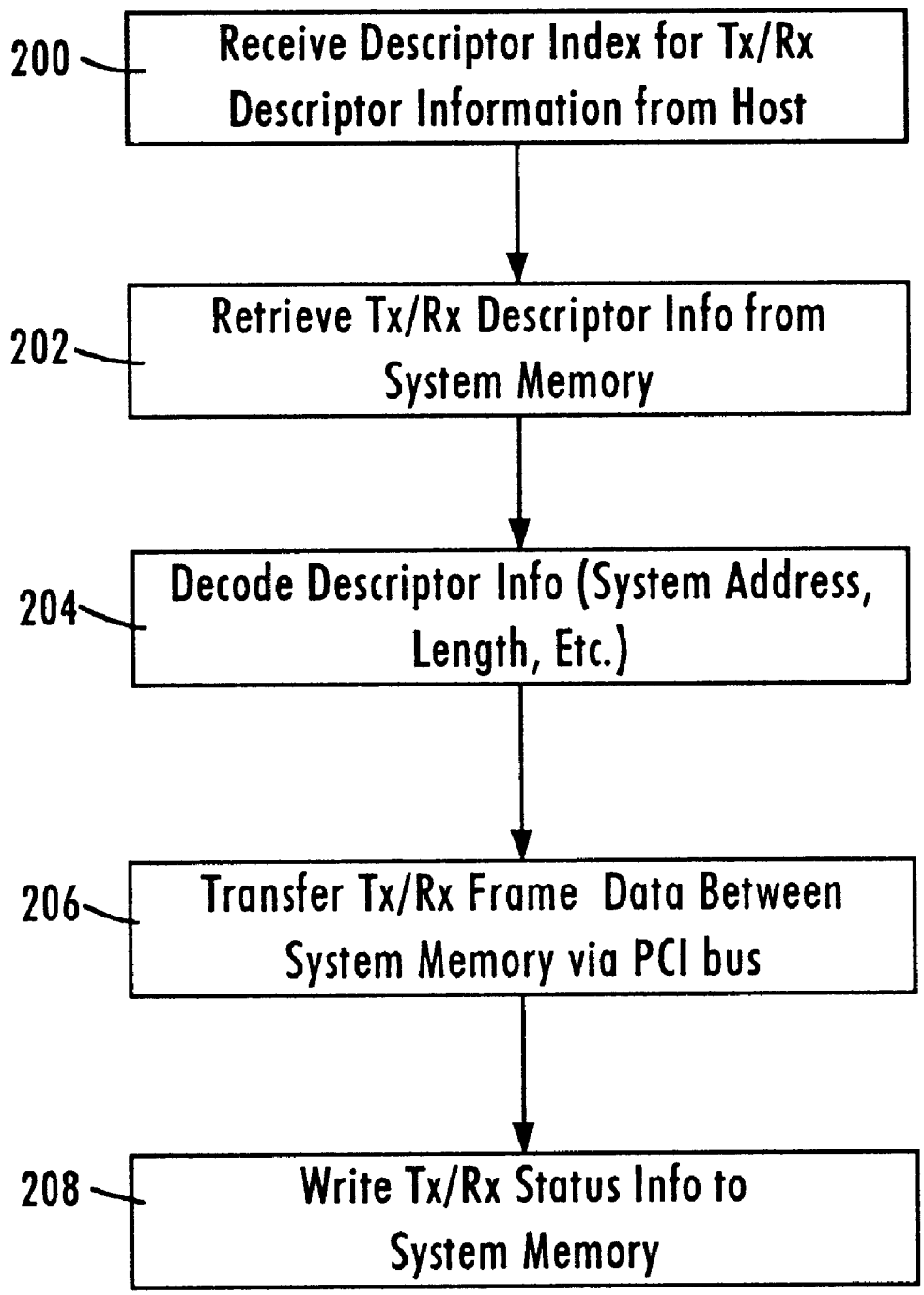
FIG. 7 is a diagram illustrating a method of transferring frame data by the descriptor management 18 between system memory and the random access buffer memories.

FIG. 7 is a flow diagram illustrating operations by the descriptor management 24 in controlling the transfer of frame data between the system memory 104 and the buffer memory 18. As shown in FIG. 7, the descriptor management receives from the host computer descriptor index information that specifies the location in system memory of the descriptors 100. For example, the host CPU may first write the frame data 106 into the system memory 104, then write the corresponding descriptors 100 in a second location in system memory. The host computer will then write to a control register in the descriptor management 24 addressable by the host CPU on the PCI bus, that identifies the location of the descriptors 100 and releases control of the descriptors from the host CPU to the network interface device 10.

In response to receiving the descriptor index information in step 200, the descriptor management 24 retrieves the descriptor information 100 from the host computer memory in step 202 by performing a DMA read operation via the PCI bus 12. Specifically, the descriptor management 24 generates a descriptor read request from the arbiter 54. The arbiter 54 controls access of the PCI bus 12 by the network interface device 10 in DMA mode. As such, the arbiter 54 prioritizes between frame data transfer requests and descriptor requests to avoid overflow or underflow conditions in the RX_SRAM 18a or the TX_SRAM 18b.

The arbiter 54 returns a grant to the descriptor management 24 and in response generates a PCI bus request signal (REQ#) on the PCI bus. Once the PCI bus arbiter (e.g., the host CPU) generates a grant (GNT#), the descriptor management 24 in response fetches the descriptor information 100 in step 202.

As shown in FIG. 6, each descriptor 100 includes a 64-bit system address (e.g., TX_BUF_ADDR) that points to a corresponding system memory location $102_i$. The descriptor management also determines the length of the corresponding frame data fragment 106 by reading the corresponding length from the buffer length field (BUF LENGTH). After decoding the descriptor information in step 204, the descriptor management 24 initiates a second PCI bus transfer in step 206 to transfer the frame data $106_i$ between the system memory 104 and the appropriate SRAM buffer 18.

Following transfer of the frame data 106 in step 206 (e.g., burst transferring the transmit data 106 from the host computer memory 106 to the random access transmit buffer 18b), the descriptor management 24 issues a third PCI bus transfer in step 208 to write status information to the host computer memory based on the successful burst transfer in step 206, releasing control of the descriptors 100 back to the driver software executed by the host CPU.

Although FIG. 6 is disclosed with respect to the transmit buffer in system memory, the above-described procedures in FIGS. 6 and 7 is identical for receive data, where the descriptor management 24 fetches descriptor information from system memory that specifies the locations in system memory where the network interface device 10 is to transfer the receive data from the receive SRAM 18a to the system memory 104. Hence, the descriptor management follows the same sequence of fetching descriptor information, burst transferring the stored receive data to the destination via the host bus based on the amount of stored receive data in the RX_SRAM and the corresponding descriptors, and writing status information to the host computer memory based on the burst transfer of the stored receive data to the destination. According to the disclosed embodiment, the descriptor management 24 writes a single double word (DWORD) of status information for transmit data, and two DWORDs of status information for receive data.

Hence, the descriptor management 24 maintains a certain number of descriptors in the network interface device 10 as needed to transfer transmit data and receive main data between the system memory and the random access buffer memories 18. Hence, the amount of memory space on the network interface device needed to control data transfers is minimized. Further, the disclosed arrangement provides an efficient protocol with the driver software executed by the host CPU, minimizing contention conditions for determining whether certain descriptors 100 are to be accessed by the network interface device 10 or the driver software.

FIGS. 8A, 8B, 8C, and 8D are diagrams illustrating the data flow architecture of the XB_MMU 22a, the XM_MMU 22b, the RM_MMU 22d, and the RB_MMU 22c, respectively. Each of the management blocks 22a, 22b, 22c, and 22d include delay flip flops 210 and holding registers 212. Each holding register 212 includes a multiplexer and a D flip flop, enabling the holding register 212 to selectively store input data for a multiple number of clock cycles used to drive the corresponding D flip flop, based on controlling the selection input to the multiplexer.

Figure 8A:
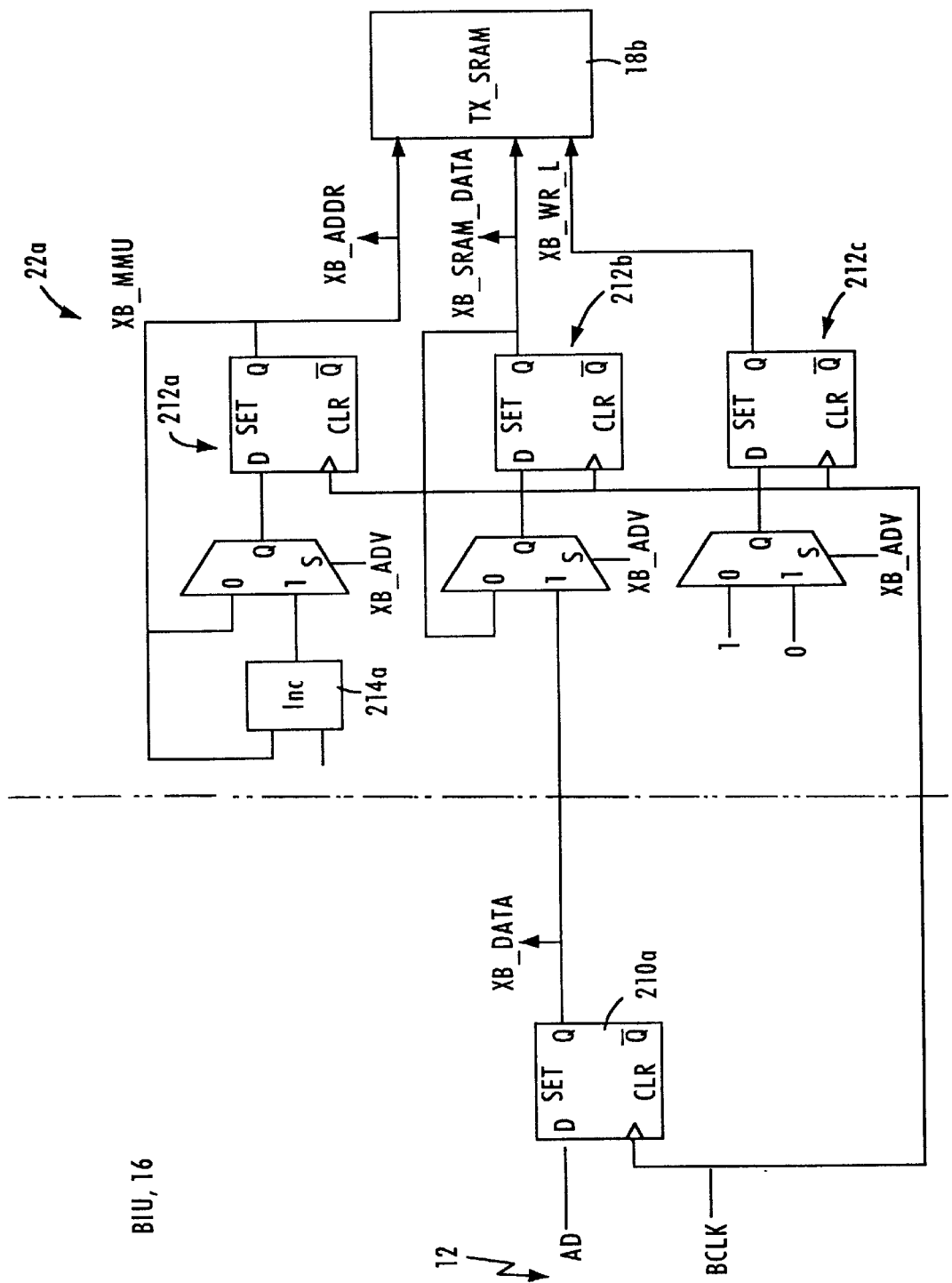
FIGS. 8A, 8B, 8C, and 8D are block diagrams illustrating holding registers used to buffer data input to the transmit random access memory, output from the transmit random access memory, input to the receive random access buffer memory, and output from the receive random access buffer memory, respectively.

As shown in FIG. 8A, the bus interface unit 16 includes a D flip flop 210a that latches the data (XB_DATA) from the AD signal path of the PCI bus 12 in response to the host bus clock (BCLK). The D flip flop 210a outputs the 32-bit XB_DATA signal to the holding register 212b, which selectively latches the XB_DATA in response to an XB_ADV signal received from the BIU 16. According to the disclosed embodiment, the multiplexer of holding register 212b is a multiple-selection input multiplexer, such that byte packing may be performed on the received XB_DATA. Hence, the data output by the holding register 212b (XB_SRAM_DATA) is aligned in the TX_SRAM to avoid the presence of invalid data within the TX_SRAM due to invalid byte lanes (i.e., "holes"). The holding register 212a outputs the write address pointer (XB_ADDR), as controlled by the incrementer 214a, controlled by the XB_MMU 22a. As shown in FIG. 8A, the supply of data from the PCI bus 12 is performed in the host bus (BCLK) domain. Hence, the XB_ADV signal from the BIU 16 enables the XB_MMU to increment the write pointer in holding register 212a, and to supply data to the dual-port TX_SRAM 18b.

Figure 8B:
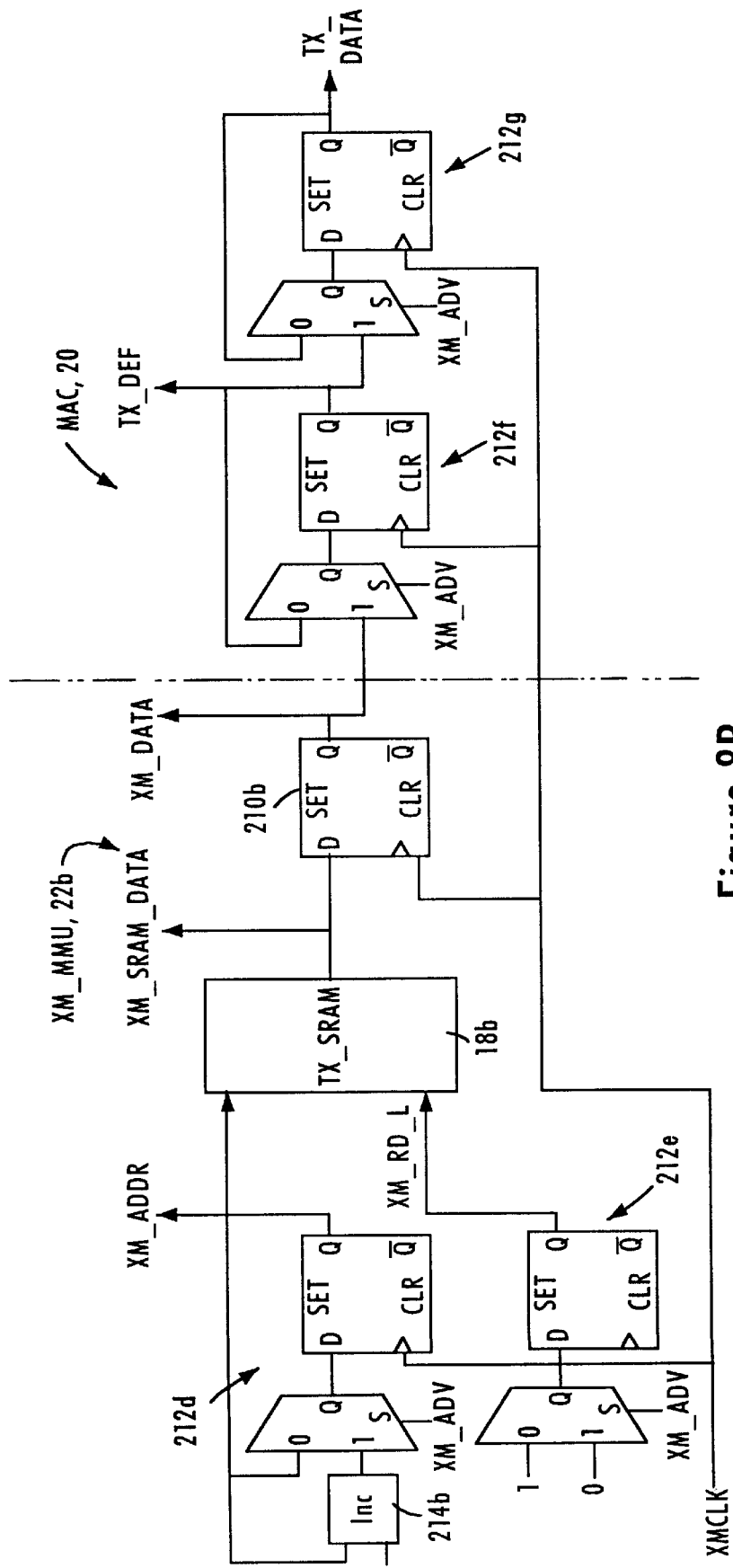

FIG. 8B is a diagram illustrating in further detail the data path of the XB_MMU 22b and the MAC 20. The XB_MMU 22b includes holding registers 212d, 212e, delay flip flop 210b, and incrementer 214b. The MAC 20 includes holding register 212f, and holding register 212g.

As shown in FIG. 8B, the incrementer 214b, under the control of the XM_MMU 22b, controls the read address pointer stored in holding register 212d. The MAC 20 outputs an advance signal (XM_ADV), used to increment the read pointer in holding register 212d and the read signal in holding register 212e. According to the disclosed embodiment, the MAC 20 is able to assert the XM_ADV advance signal until the TX_SRAM is empty, based on an empty flag TX_SRAM_EMPTY) generated by the synchronization block 60. Note the last two holding registers 212f and 212g are part of the MAC 20.

Figure 8C:
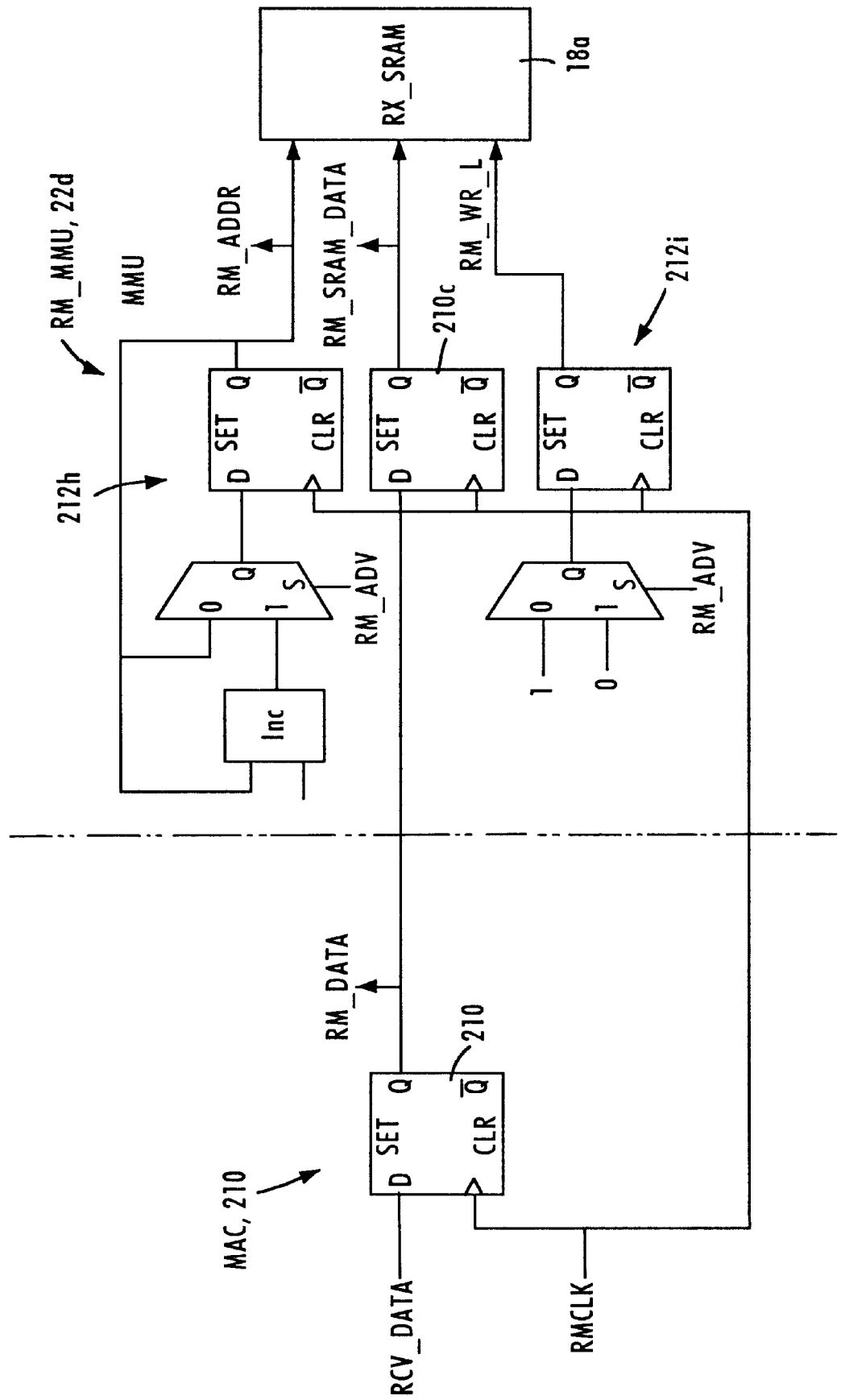

FIG. 8C is a diagram illustrating the data path in the RM_MMU 22d. As shown in FIG. 8C, the MAC 20 has a delay flip flop 210 that outputs the data in nibble (i.e., 4 bits) mode, such that the advance signal (RM_ADV) is asserted by the MAC 20 once every eight clock cycles (RMCLK), such that there is one clock cycle for each nibble. Although not shown in FIG. 8C, the RM_MMU 22d and the XB_MMU 22a will multiplex frame track information into the RX_SRAM_DATA and XB_SRAM_DATA paths, respectively. The RM_MMU 22d also includes holding registers 210c, 212h, and 212i, which function similar to those components in 22a.

Figure 8D:
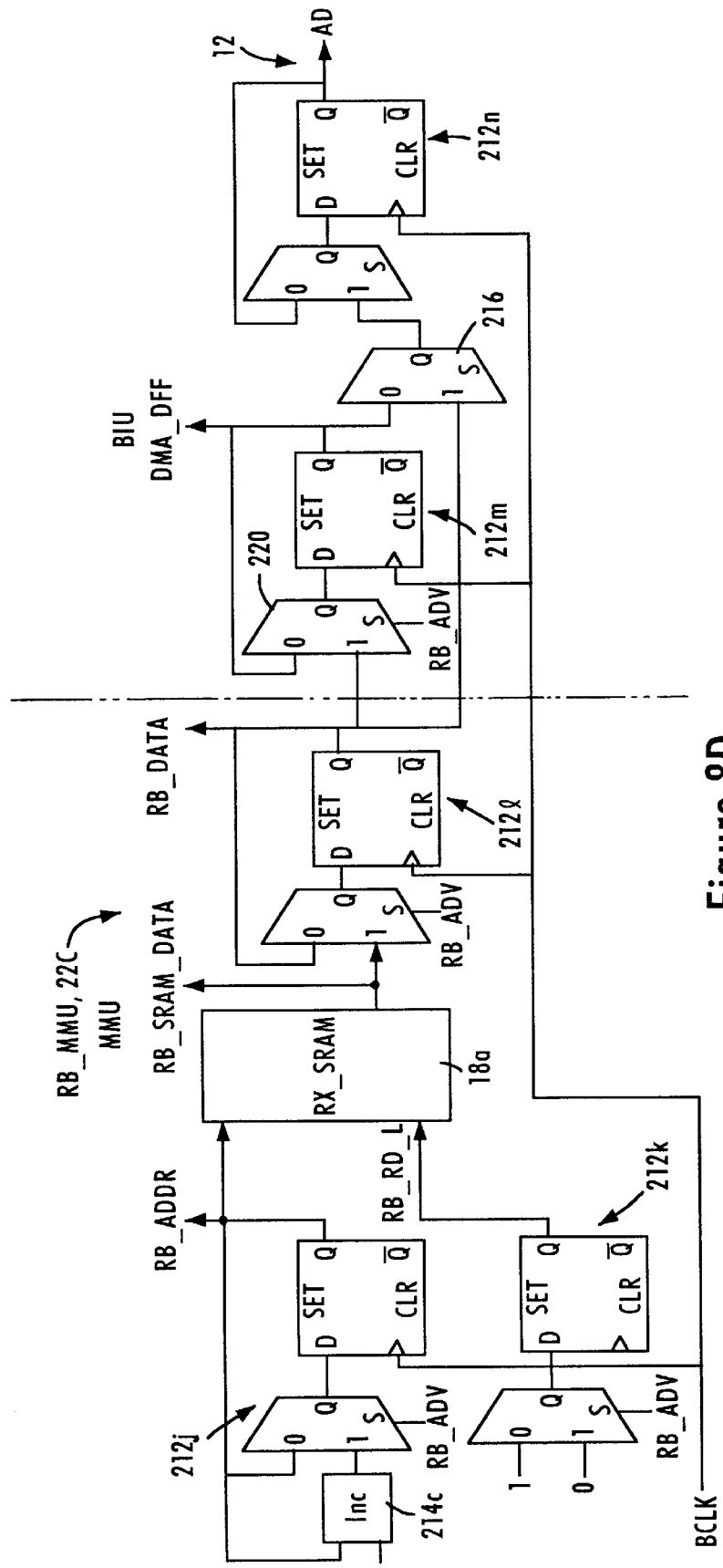

FIG. 8D is a diagram illustrating in detail the data path for the RB_MMU 22c. According to the disclosed embodiment, the RB_MMU 22c outputs the data onto the AD signal path of the PCI bus 12 with zero wait states in a DMA transfer, based on the holding registers 212l, 212m, 212n, and the multiplexer 216. As shown in FIG. 8D, the advance signal RB_ADV output by the BIU 16 is used to drive the read pointer stored in holding register 212j, and the read pointer stored in holding register 212k. As described above, the read pointer value stored in holding register 212j is controlled by the incrementer 214c. Hence, the RX_SRAM 18a outputs a double word of data from a prescribed location pointed to by the read pointer value (RB_ADDR) as a 32-bit signal RB_SRAM_DATA. The holding register 212l outputs the signal RB_DATA based on the RB_ADV signal and the bus clock (BCLK) signal. Although not shown, the holding register 212l also performs byte alignment relative to the PCI bus 12 based on byte alignment (BE_L) signals received by the multiplexer 220 from the descriptor management 24. The holding register 212l outputs the RB_DATA signals to the holding register 212m and the multiplexer 216. The holding register 212m is configured to resolve any wait states or bus termination conditions (e.g., disconnect, retry) that may occur on the PCI bus 12. The multiplexer 216 and the multiplexer of the holding register 212n are controlled by a state machine (not shown) in the bus interface unit.

As described above, DMA transfer sequences are initiated by the descriptor management 24 generating a request to the arbiter 54. Once the request is granted by the arbiter 54 and sent to the BIU 16, the BIU 16 issues a grant signal to the MMU 52 concurrent with issuing a request (REQ#) signal on the PCI bus. In response to the grant signal, the BIU 16 also asserts the advance signal (RB_ADV) for a prescribed number of clock cycles, causing the holding registers 212l, 212m, and 212n to be loaded with receive data from the SRAM 18a even before transmission on the PCI bus 12 begins by the network interface device 10. Hence, the receive data is effectively preloaded into the holding registers 212l, 212m, and 212n in anticipation of a DMA burst, eliminating the occurrence of any wait states following the address phase of the PCI burst. Moreover, the BIU 16 can selectively control the RB_ADV signal in response to detected conditions on the PCI bus. Hence, if the grant (GNT#) signal is not detected on the PCI bus within a prescribed interval, or if PCI bus transfer is halted by assertion of either the target ready (TRDY#) or stop (STOP#) signals, the RB_MMU 22c and the BIU 16 can suspend the transfer of data on the PCI bus, and continue outputting receive data on the PCI bus 12 without the necessity of reloading the holding registers 212l, 212m, and 212n.

According to the disclosed embodiment, the memory management unit provides an efficient manner for reading and writing frame data from a transmit random access buffer memory and a receive random access buffer memory, despite the presence of multiple clock domains. The use of holding registers also enables the efficient pipelining of data, such that zero wait states are encountered during a DMA burst write, and minimal delay is encountered during retransmission in response to a detected disconnect or retry condition on the PCI bus.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network interface device for sending data frames from a host computer to a network medium, comprising:
   storing transmit data received from a host bus into a random access transmit buffer according to a host bus clock;
   asynchronously monitoring the amount of data stored in the random access transmit buffer; and
   outputting the stored transmit data from the random access transmit buffer to a media access controller according to a transmit clock independent from the host bus clock and based on the asynchronously monitoring step, for transmission on the network medium.

2. The method of claim 1, wherein the random access transmit buffer includes an input port and an output port, the storing step comprising supplying the transmit data to the random access transmit buffer via the input port.

3. The method of claim 2, wherein the outputting step comprises supplying the transmit data to the media access controller via the output port.

4. The method of claim 1, wherein the asynchronously monitoring step comprises:
   incrementing a write pointer value in response to the storing step;
   incrementing a read pointer value in response to the outputting step; and
   asynchronously comparing the write pointer value and the read pointer value to determine an amount of stored data in the random access transmit buffer.

5. The method of claim 4, wherein the asynchronously monitoring step further comprises outputting a first signal to the media access controller indicating a presence of at least a prescribed amount of the stored data for transmission, based on the asynchronously determining step.

6. The method of claim 5, wherein the outputting step comprises:
   outputting a second signal from the media access controller in response to the first signal and in response to a detected idle condition on the network medium; and
   supplying the stored transmit data from the random access transmit buffer to the media access controller in response to the second signal.

7. The method of claim 6, wherein the outputting step further comprises asynchronously determining the amount of transmit data corresponding to a data frame output by the media access controller.

8. The method of claim 7, wherein:
   the asynchronously monitoring step further comprises selectively storing in a holding register information identifying the amount of transmit data corresponding to said data frame in response to said storing step and the host bus clock, and based on a determined presence of at least one data frame in the random access transmit buffer;
   the asynchronously determining step comprises reading the information identifying the amount of transmit data corresponding to said data frame from the holding register based on the transmit clock.

9. The method of claim 1, further comprising:
   storing receive data received from the media access controller into a random access receive buffer according to a receive clock independent from the host bus clock and the transmit clock;
   asynchronously monitoring the amount of receive data stored in the random access receive buffer; and
   outputting the stored receive data from the random access receive buffer onto the host bus according to a the host bus clock and based on the step of asynchronously monitoring the amount of stored receive data.

10. The method of claim 9, wherein:
    the random access transmit and the random access receive buffers each comprise an input port and an output port;
    the transmit data storing step comprises supplying the transmit data to the input port of the random access transmit buffer according to the host bus clock; and
    the stored transmit data outputting step comprises supplying the transmit data to the media access controller via the output port of the random access transmit buffer according to the transmit clock.

11. The method of claim 10, wherein:
    the receive data storing step further comprises supplying the receive data to the input port of the random access receive buffer according to the receive clock; and
    the stored receive data outputting step further comprises supplying the receive data to the host bus via the output port of the random access receive buffer according to the host bus clock.

12. The method of claim 9, wherein the media access controller has transmit and receive ports, the stored transmit data outputting step comprising supplying the stored transmit data to the transmit port independent of the receive data storing step via the receive port.

13. The method of claim 9, wherein the media access controller has transmit and receive ports, the receive data storing step comprising supplying the receive data to the random access receive buffer via the receive port independent of the stored transmit data outputting step via the transmit port.

14. The method of claim 9, further comprising:
    retrieving first descriptor information from the host computer memory specifying a destination for the stored receive data;
    burst transferring the stored receive data to the destination via the host bus based on the amount of stored receive data in the random access receive buffer; and
    writing status information to the host computer memory based on the burst transfer of the stored receive data to the destination.

15. The method of claim 14, further comprising:
    retrieving second descriptor information from the host computer memory specifying a source for the transmit data in the host computer memory;
    burst transferring the transmit data from the source to the random access transmit buffer based on the descriptor information and the amount of data stored in the random access transmit buffer; and
    writing status information to the host computer memory based on the burst transfer of the transmit data to the host computer memory.

16. The method of claim 15, further comprising prioritizing between the burst of the receive data and the burst transferring of the receive data based on the amounts of data stored in the random access receive buffer and the random access transmit buffer, respectively.

17. A method in a network interface device for receiving data frames from a network medium, comprising:

storing receive data received from a media access controller into a random access receive buffer according to a network receive clock;

asynchronously monitoring the amount of data stored in the random access receive buffer; and outputting the stored receive data from the random access receive buffer to a host bus interface according to a host bus clock independent from the network receive clock and based on the asynchronously monitoring step, for transmission on a host bus.

18. The method of claim 17, wherein the random access receive buffer includes an input port and an output port, the storing step comprising supplying the receive data to the random access receive buffer via the input port based on the monitoring step.

19. The method of claim 18, wherein the outputting step comprises supplying the receive data to the host bus interface via the output port.

20. The method of claim 17, wherein the asynchronously monitoring step comprises:

incrementing a write pointer value in response to the storing step;

incrementing a read pointer value in response to the outputting step; and asynchronously comparing the write pointer value and the read pointer value to determine the amount of data stored in the random access receive buffer.

21. The method of claim 17, further comprising:

retrieving descriptor information from the host computer memory specifying a destination for the stored receive data;

burst transferring the stored receive data to the destination via the host bus based on the amount of stored receive data; and writing status information to the host computer memory based on the burst transfer of the stored receive data to the destination.

22. A network interface device, comprising:

a media access controller configured for simultaneously outputting transmit data according to a network transmit clock, and receiving receive data from a network medium according to a network receive clock;

a bus interface unit configured for transferring via a host bus the receive data and the transmit data to and from a host computer memory according to a host bus clock;

a random access receive buffer configured for storing the receive data received by the media access controller according to the network receive clock, and outputting the stored receive data to the bus interface unit according to the host bus clock;

a random access transmit buffer configured for storing the transmit data supplied by the bus interface unit according to the host bus clock, and outputting the stored transmit data to the media access controller according to the network transmit clock; and a memory management unit configured for controlling the transfer of the transmit data and receive data in the random access transmit buffer and the random access receive buffer, the memory management unit comprising a synchronization circuit for asynchronously monitoring the amount of data stored in the random access transmit buffer and the random access receive buffer.

23. The network interface device of claim 22, wherein the memory management unit further comprises:

a first management block for controlling the transfer of the transmit data from the host computer memory to the random access transmit buffer according to the host bus clock and based on the amount of data specified by the synchronization circuit; and a second management block for controlling the transfer of the stored transmit data from the random access transmit buffer to the media access controller according to the network transmit clock and based on the amount of data specified by the synchronization circuit.

24. The network interface device of claim 23, wherein:

the first management block includes a write counter for incrementing a write pointer value in response to writing the transmit data to the random access transmit buffer;

the second management block includes a read counter for incrementing a read pointer value in response to reading the transmit data from the random access transmit buffer; and the synchronization circuit asynchronously determines the amount of data stored in the random access transmit buffer based on the write pointer value and the read pointer value.

25. The network interface device of claim 24, wherein the write counter and the read counter each increment the corresponding pointer value by changing a single bit of the corresponding pointer value.

26. The network interface device of claim 23, wherein the memory management unit further comprises:

a descriptor management unit configured for fetching, from the host computer memory, transfer information specifying locations in the host computer memory for at least one of the receive data and the transmit data; and an arbitration unit for selectively causing the transfer of one of the transmit data and the receive data on the host bus based on the amount of data stored in the random access transmit buffer and the random access receive buffer.

27. The network interface device of claim 26, wherein the descriptor management unit writes status information to the host computer memory in response to the transfer of the transmit data from the host computer memory.

28. The network interface device of claim 23, wherein the memory management unit further comprises:

a third management block for controlling the transfer of the receive data from the media access controller to the random access receive buffer according to the network receive clock and based on the amount of data stored in the random access receive buffer specified by the synchronization circuit; and a fourth management block for controlling the transfer of the stored receive data from the random access receive buffer to the host computer memory according to the host bus clock and based on the amount of data stored in the random access receive buffer specified by the synchronization circuit.

29. The network interface device of claim 28, wherein the synchronization circuit generates a full flag based on the amount of stored data exceeding a prescribed value and the third management block halts the transfer of the receive data based on the generation of the full flag.

30. The network interface device of claim 29, wherein the memory management unit further comprises:
- a descriptor management unit configured for fetching, from the host computer memory, transfer information specifying locations in the host computer memory for at least one of the receive data and the transmit data; and
- an arbitration unit for selectively causing the transfer of one of the transmit data and the receive data on the host bus based on the amount of data stored in the random access transmit buffer and the random access receive buffer.

31. The network interface device of claim 30, wherein the descriptor management unit writes transfer information to the host computer memory in response to the transfer of the receive data to the host computer memory.

32. The network interface device of claim 29, wherein the arbitration outputs a direct memory access (DMA) request onto the host bus for the transfer of one of the transmit data and the receive data.

33. The network interface device of claim 29, wherein the third management block includes at least one register configured for storing a prescribed amount of the receive data for a prescribed successive number of network receive clock cycles, and outputting the prescribed amount of data to the random access receive buffer in a single network receive clock cycle.

34. The network interface device of claim 29, further comprising an array of holding registers for outputting the stored receive data to the host bus clock with zero wait states on the host bus, based on conditions detected by the bus interface unit on the host bus.

35. The network interface device of claim 23, wherein the first management block includes at least one holding register configured for selectively supplying bytes of the transmit data from the host bus to the random access transmit buffer.

36. The network interface device of claim 23, wherein the second management block includes at least one holding register configured for selectively supplying bytes of the stored transmit data from the random access transmit buffer to the media access controller based on an advance signal from the media access controller.

37. The network interface device of claim 36, wherein the media access controller asserts the advance signal for at least one clock cycle over a prescribed number of network transmit clock cycles.

38. The network interface device of claim 22, wherein the memory management unit is configured to control the transfer of the transmit data and receive data according to one of a master mode and a slave mode.

* * * * *